Figure 1:
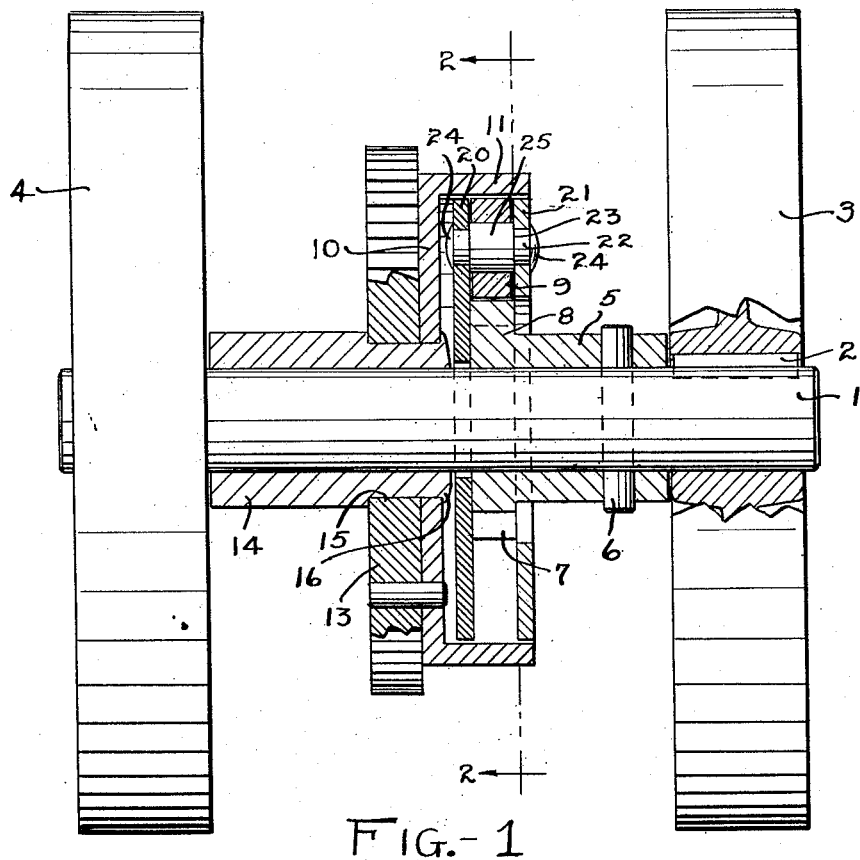

Dec. 14, 1926.

J. KELLER, SR 1,610,794

CLUTCH

Filed Feb. 20, 1925

Inventor
Julius Keller Sr.,
By Bates, Macklin,
Golrick & Teare Attorneys

Patented Dec. 14, 1926.

1,610,794

UNITED STATES PATENT OFFICE.

JULIUS KELLER, SR., OF CHICAGO, ILLINOIS.

CLUTCH.

Application filed February 20, 1925. Serial No. 10,477.

This invention relates to power transmission clutches such as are used in traction driven vacuum cleaners or wherever power is delivered to the clutch with an intermittent forward movement. The essential object is to provide a very compact quickly acting friction clutch capable of gripping in one direction and being free when the direction of rotation is reversed, which may be very simply made from a minimum number of parts, and which will not be likely to get out of repair by reason of the wearing of the parts. More specifically the object is to provide a clutch in which the moving parts when worn will not need to be adjusted or replaced to cause these parts to act simultaneously in effecting a clutching engagement between a driving and driven member.

In a great many uses such as the above mentioned it is difficult either by reason of prohibitive manufacturing cost or available space to provide a positively operated clutch which shall be certain of picking up its load with no delay at the start. For example in operating a traction driven vacuum cleaner or sweeper, the stroke is often very short and it is very desirable that the clutch respond immediately to the forward movement of the machine, otherwise there is no movement imparted to the suction mechanism. The clutch which I have shown comprises a plurality of eccentric friction pawls or cams adapted to engage a clutch surface and one of the features of my invention is that these pawls are so supported that the engagement of one alone with the surface of the cooperating clutch member whereby all the wear and strain may devolve on this one pawl is prevented. In short I have arranged all the pawls to operate simultaneously irrespective of wear or other minor defect of some of the pawls.

In the preferred form shown in the drawings, the clutch employs the usual clutch drum having an overhanging annular rim and the pawls are formed with increasing radii adapted to engage this annular surface and are mounted on a member which floats independently of the pawl operating means and of the drum. The movement of the pawls to engage the clutch drum is preferably effected by a dental engagement between a driving member and the pawls, and another feature of the invention here appears in the design of the pawls which permits a slight reverse movement of the driving member to effect a positive disengagement of the pawls acting equally on all of the pawls whereby in the subsequent driving movement the clutch takes up its load again with a minimum of lost motion.

Other features will appear in the description to follow which relates to the accompanying drawings wherein I have illustrated the preferred form of my invention. The essential novel characteristics will be summarized in the claims.

Figure 2:
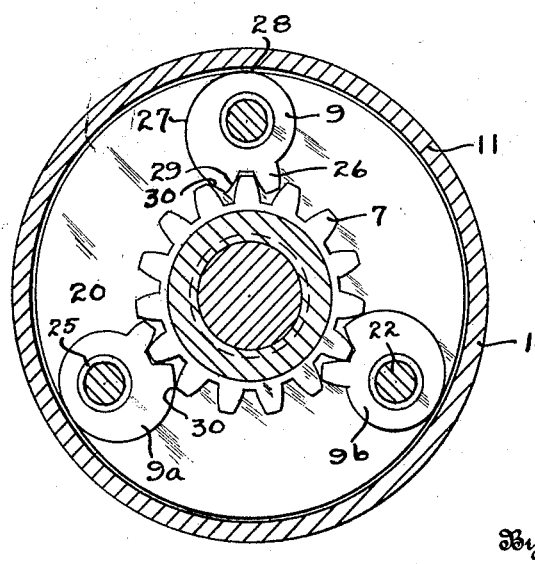

In the drawings, Fig. 1 is a view showing my clutch in substantially central longitudinal section, Fig. 2 is a transverse section taken along the line 2—2 of Fig. 1.

Indicating the various parts of my invention and the members associated therewith by numerals, a driving member or shaft is indicated at 1 which may be suitably connected as by a key 2 to one or more of a pair of driving members 3 and 4. These driving members it will be assumed are rotated intermittently backward and forward. Rigid on the shaft I have shown a tubular member 5 which may be pinned to the shaft as at 6 and which is provided with teeth 7 formed on a flanged portion 8. The teeth are arranged to coact with eccentric pawls 9 to force them into engagement with a clutch drum member 10 having an overhanging annular flange 11. The clutch drum may be rigid as shown with a driving gear or wheel 13 mounted on a tubular member 14. The tubular member is shown as freely mounted on the shaft 1 and as having a reduced portion 15 extending through the gear and an opening in the drum and as peened over at 16 to hold the drum and gear rigidly together. The gear may be considered as capable of transmitting power to any desired mechanism.

To insure the positive action of all of the pawls simultaneously, I have shown the pawls as pivotally mounted between a pair of substantially flat annular members 20 and 21. Suitable means such as rivets 22 shouldered at 23 and riveted over at 24 against the annular members may serve to hold the pawls in place, in which case the enlarged cylindrical portions 25 on the rivets should be slightly longer than the pawl whereby the pawls may turn freely thereon without frictional engagement with the annular members. It will be noted that the annular members 20 and 21 are radially spaced apart at their inner and outer peripheries from the shaft or gear member 5 and from the flange of the clutch drum so that the annular members may have a limited independent movement within the drum to allow all of the pawls to engage and uniformly grip the drum.

The pawls are shown as having projections or teeth 26 which engage the teeth 7 of the gear member and are further provided with a body portion 27 of increasing radius from a point 28 terminating in the abutment 29. In operation a slight counter-clockwise movement of the gear as shown in Fig. 2 will impart a clockwise movement to all of the pawls by reason of the engagement between the teeth 26 and 7 and the increasing radius 27 will bear with a wedging action against the inner periphery of the drum. The gripping effect of all the pawls is the same thus even though mechanical inaccuracies are present the forces balance and shift the members 20 and 21 to allow the pawls to act evenly. For instance, if the pawl 9ª Fig. 2 were to become somewhat worn, the pawls 9 and 9ᵇ would engage first and the reaction against their pivots would shift the plates 20 and 21 in the direction of the pawl 9ª to cause an equal engagement of this pawl with the clutching surface of the drum.

When the rotation of the driving member is reversed, the pawls are quickly swung out of engaging position and held only slightly separated from the drum by reason of the engagement between the working faces of the engaging teeth the reverse swing being stopped by the engagement of the teeth of the gear with the blank periphery of the pawl as at 30. It follows that during the subsequent forward movement of the driving member there is only a very slight loss of motion before the cams are moved to gripping or driving engagement.

By making the gear 7 a complete gear it may be more easily formed by modern gear machinery than were only part of the teeth to be cut. Moreover, by providing it with normally inoperative teeth I am enabled to repair the clutch in case the operating teeth become worn or even broken by simply sliding the clutch drum clear of the pawls, turning the pawls so that both the teeth 26 and the abutment 29 are clear of teeth 7 and then the gear may be partially rotated to bring a new region of teeth into cooperating position. My clutch has several advantages over the usual types such as the well known ball or roller clutch. In these clutches the balls or rollers will often entirely fail to function when worn or when heavy lubricant is used. Rollers easily get out of place and jam the clutch or the displacement results in one roller only doing all the work. My clutch will operate just as well with one lubricant as another since the force of the driving member during its working stroke operates immediately to throw the pawls into definite positive engagement irrespective of the speed of operation.

It will be seen that I have provided a very simple and positively operating clutch which may be conveniently made in any size and for any purpose which friction clutches may serve. It is to be understood that various changes may be made in its construction without departing from the spirit of my invention.

Having thus described my invention, I claim:

1. A clutch comprising a pair of rotatable members, means for driving one of the said rotatable members including a plurality of eccentric pivotally mounted pawls, a speed increasing gear connection between said pawls and one of said rotatable members, a clutch member rigid with the other rotatable member having a surface adapted to be engaged by the pawls, the pivotal mountings for the pawls being slightly movable laterally as a unit with reference to both rotatable members whereby all the pawls may be caused to simultaneously engage the clutch surface.

2. A clutch comprising a pair of rotatable members one being adapted to have an intermittent forward and backward movement, three eccentric pivotally mounted pawls, means for connecting the pawls to said intermittently rotating member, a clutch surface rigid with the other rotatable member adapted to be engaged by the pawls, a member providing a two point support for the bearings of each of the pawls and maintaining the axes of rotation of the pawls in fixed relation and means whereby the supporting member may shift laterally to cause all the pawls to engage the clutch surface with equal gripping force.

3. In a clutch, a driven member having a cylindrical inner peripheral surface, pivoted friction pawls with their axes of rotation in fixed relation, each having a portion of its periphery formed in a helix for drivingly engaging the cylindrical surface, gear teeth on said pawls, a driving member and a gear rigid therewith, the teeth of which bear on the teeth of the pawls to maintain the pawls out of contact with said surface when the driving member is rotated in one direction and means including a member for supporting the pawls, said member having a radial floating movement whereby when the driving member is rotated in the other direction, all the pawls are caused to engage the cylindrical surface with equal gripping force.

In testimony whereof, I hereunto affix my signature.

JULIUS KELLER, Sʀ.